Feb. 7, 1956 R. F. BLOCK 2,733,738
TRACTOR DRIVEN FLUID TRANSMISSION CHAIN SAW
Filed Aug. 6, 1954 3 Sheets-Sheet 1
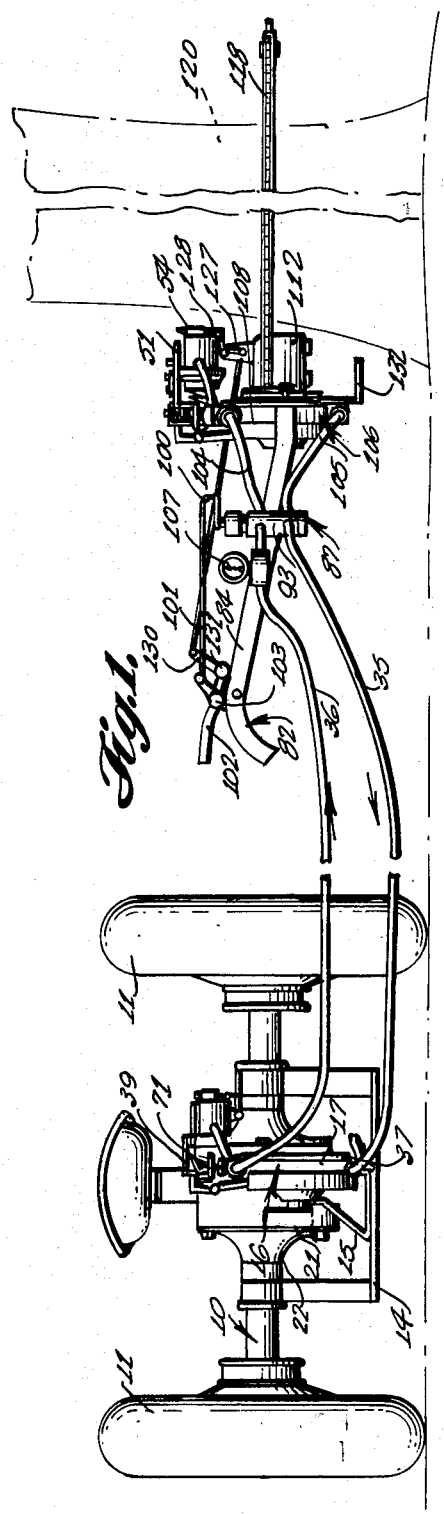
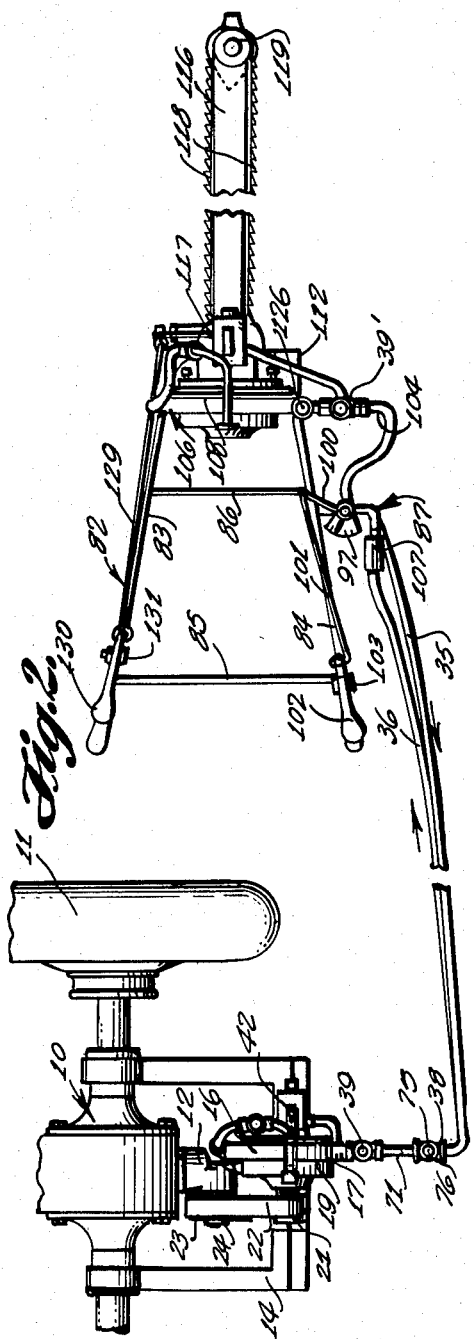
INVENTOR.
Richard F. Block
BY Victor J. Evans & Co.
ATTORNEYS

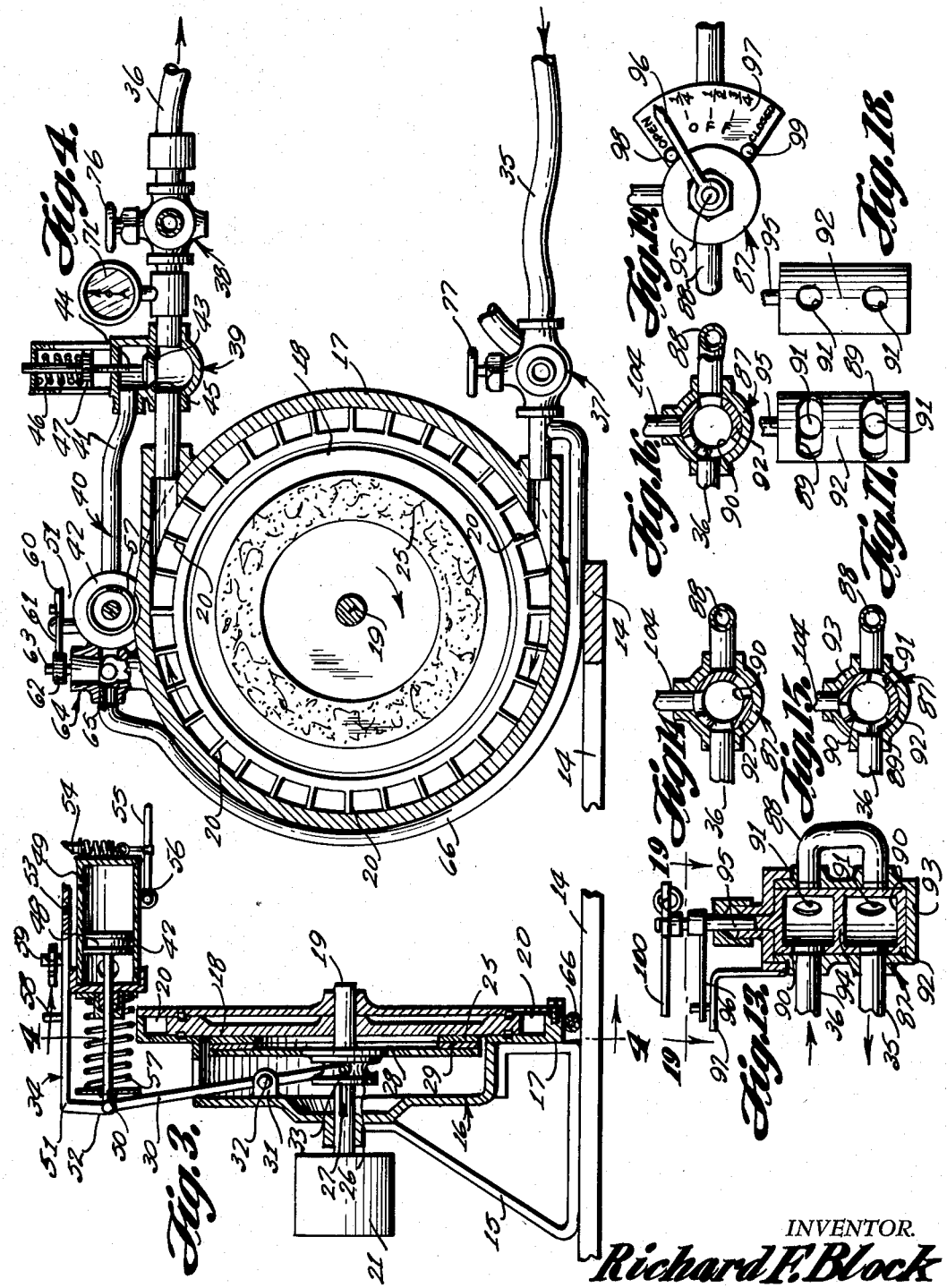

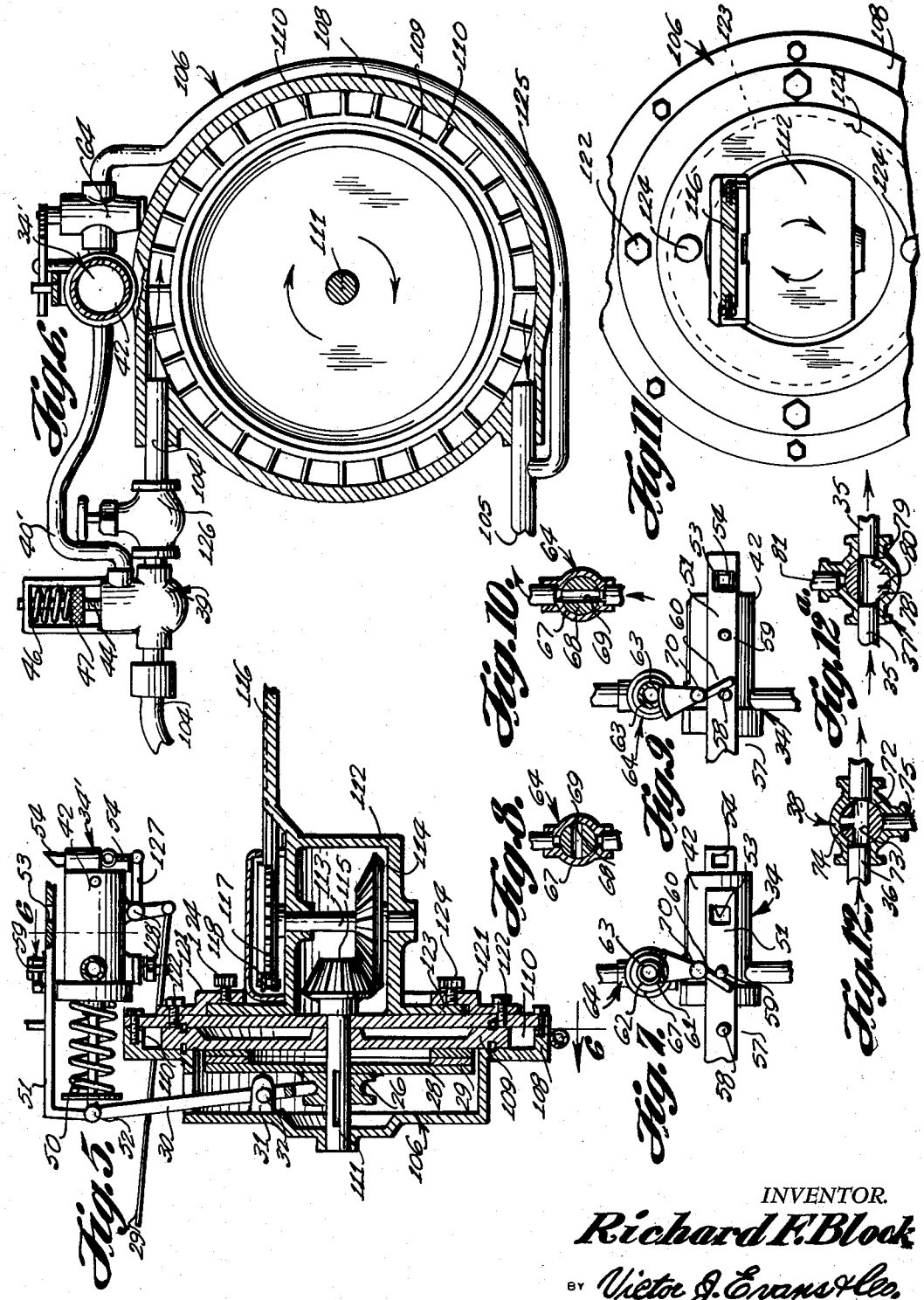

United States Patent Office 2,733,738
Patented Feb. 7, 1956

2,733,738

TRACTOR DRIVEN FLUID TRANSMISSION CHAIN SAW

Richard F. Block, Morley, Mich.

Application August 6, 1954, Serial No. 448,243

1 Claim. (Cl. 143—32)

This invention relates to a saw, and more particularly to a chain saw adapted to be connected to and actuated by a tractor.

The object of the invention is to provide a chain saw which can be used for felling trees and the like, the chain saw adapted to be actuated by a hydraulic system which is operated by a tractor power take-off.

Another object of the invention is to provide a sawing machine for cutting down trees or sawing trunks into desired lengths, the saw being constructed so that it can be readily manually manipulated by one or more persons, there being a noval mechanism provided for controlling speed of the saw as well as preventing damage to the parts during use of the saw.

A still further object of the invention is to provide a chain saw which is hand supported and which includes hydraulic means for actuating the saw, the saw adapted to be actuated by the power take-off from a tractor such as a Ford tractor, although it is to be understood that the saw can be used with certain modifications on other types of tractors, the saw being light in weight yet extremely powerful since it derives its power from the tractor engine.

A further object of the invention is to provide a chain saw which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a rear elevational view of a tractor, showing the chain saw of the present invention connected thereto and being used for felling a tree.

Figure 2 is a top plan view of the chain saw of the present invention, and showing the rear portion of a tractor to which it is attached.

Figure 3 is a vertical sectional view taken through the hydraulic pump that is actuated by the tractor power take-off.

Figure 4 is a sectional view taken on the line 4—4 of Figure 3.

Figure 5 is a sectional view taken through the motor that is used for driving the chain saw.

Figure 6 is a sectional view taken on the line 6—6 of Figure 5.

Figure 7 is a plan view of the clutch control member and showing the clutch in and the valve closed.

Figure 8 is a sectional view taken through the valve actuated by the clutch control of Figure 7 and showing the valve closed.

Figure 9 is a view similar to Figure 7, but showing the parts shifted and the valve open and the clutch locked out.

Figure 10 is a view similar to Figure 8 but showing the valve open.

Figure 11 is an elevational view of the motor, with parts broken away and in section, and showing the collar or sleeve which permits rotary adjustment of the chain saw so that the chain saw can be used for making different angular cuts.

Figure 12 is a sectional view of a control valve.

Figure 12a is a sectional view of another control valve.

Figure 13 (Sheet 2) is a vertical sectional view taken through a speed control and throttle valve.

Figure 14 is a horizontal sectional view taken through the valve of Figure 13, and showing the valve member set so that hydraulic fluid all passes to the wheel or motor while the bypass is closed.

Figure 15 is a view similar to Figure 14 but showing the lines leading to the motor and bypass each one half open.

Figure 16 is a view similar to Figures 14 and 15 but showing the line to the motor closed and the bypass full open.

Figure 17 is an elevational view of the rotatable core or valve member for the valve of Figure 13.

Figure 18 is an elevational view of the valve member for the valve of Figure 13 but showing the opposite side from Figure 17.

Figure 19 is a sectional view taken on the line 19—19 of Figure 13 and showing the cooperating scale and pointer.

Referring in detail to the drawings, the numeral 10 designates a portion of a conventional tractor which may be a Ford tractor, although it is to be understood that the chain saw of the present invention can be used with other types of tractors. The tractor 10 includes the usual rear wheels 11, and a power take-off 12 which may have gears therein. Extending rearwardly from the tractor 10 is a drawbar 14 which may have a U-shaped configuration, and a bracket 15 is secured to the drawbar 14, Figure 3. The bracket 15 serves to support a hydraulic pump 16.

The pump 16 includes a hollow housing 17 that has a plate or wheel 18 rotatably mounted therein, and the plate 18 is loosely or freely mounted on a driven shaft 19. A plurality of vanes or blades 20 extend from the outer periphery of the plate 18 and are secured thereto or formed integral therewith for a purpose to be later described. Arranged exteriorly of the housing 17 and secured to an end of the shaft 19 is a pulley 21, and the pulley 21 has an endless belt 22 trained thereover. The belt 22 is also trained over a pulley 23 which is mounted on a shaft 24 that is operated by the power take-off 12 of the tractor, Figure 2. Although the previously described belt drive has been illustrated, it is to be understood that other means can be provided for driving the shaft 19 besides the belt drive as for example a gear drive can be used.

Secured to one side of the plate 18 is a friction disc 25, and slidably keyed to the shaft 19 is a collar 26, there being a key 27 for connecting the collar 26 to the shaft 19, Figure 3. A clutch member 28 is secured to the collar 26, and the clutch member 28 carries a ring member 29 that is mounted for movement into and out of frictional engagement with the friction disc 25. Thus, when the parts are in the position shown in Figure 3, the members 29 and 25 are frictionally engaging each other so that as the shaft 19 is rotated by the belt drive, the plate 18 and blades 20 will be rotated with the shaft. A lever 30 is pivotally connected to ears 31 which are arranged within the housing 17 by means of a pivot pin 32, and the inner end of the lever 30 is pivotally connected to the collar 26 by means of a pin 33. The lever 30 is adapted to be actuated by a clutch control mechanism 34 as later described in this application.

There is further provided a return conduit 35 which communicates with the lower end of the housing 17, and a supply conduit 36 leads from the upper end of the housing 17, Figure 4. A manually operated gate valve 37 is interposed in the conduit 35, and a manually operable gate valve 38 is interposed in the supply conduit 36. Also arranged in the supply conduit 36 is a safety valve 39 which is interconnected with the return conduit 35 by means of a bypass line or conduit 40. The bypass line 40 includes a section 41 that leads from the safety valve 39 to a cylinder 42 which forms part of the clutch control mechanism 34. The safety valve 39 is shown in closed position in Figure 4 and includes a valve member 43 that is mounted for movement into and out of closing relation with respect to a valve seat 45, and a stem 44 extends upwardly from the valve member 43, there being a coil spring 46 circumposed on the stem 44 for urging the valve member 43 into closing relation with respect to the valve seat 45. It is to be understood that when pressure in the line 36 exceeds a predetermined limit, then the valve member 43 will rise upwardly against the tension of the coil spring 46 so that the hydraulic fluid will be able to safely flow back through the bypass 40 into the conduit 35 so that damage to the parts will be prevented. The coil spring 46 abuts a stop member 47 that threadedly engages the stem 44 so that by adjusting the stop member 47 the valve member 43 can be regulated to open at any desired pressure in the line 36.

Reciprocably arranged in the cylinder 42 is a piston 48, and the cylinder 42 is provided with a vent opening 49 which permits air to pass therethrough as the piston 48 slides or moves in the cylinder 42. A piston rod 50 is secured to the piston 48, and an L-shaped latch 51 is connected to the outer end of the rod 50 by means of a pin 52. The latch 51 is provided with an opening 53 which is adapted to selectively receive therein a spring pressed keeper 54 which is mounted on an end of the cylinder 42, Figure 3. A handle 55 is pivotally connected at 56 to the lower end of the cylinder 42, and the handle 55 is also connected to the keeper 54 so that by manually depressing the handle 55, the keeper 54 can be depressed from the opening 53 in the latch 51 whereby a coil spring 57 can urge or bias the parts back to the position shown in Figure 3 from the position shown in Figure 9. In Figure 7 there is shown a fragmentary plan view wherein the parts are in the same position as shown in Figure 3.

Extending upwardly from the latch 51 is a pair of pins 58 and 59 which are arranged in spaced apart relation with respect to each other. The pins 58 and 59 are adapted to engage a handle 60 which is positioned therebetween, Figures 3, 7 and 9, and the handle 60 has teeth 61 on an end thereof which mesh with teeth 62 (Figure 4) that are arranged on the upper end of a stem 63 that projects from a control valve 64. The valve 64 is connected to the cylinder 42 by means of a conduit section 65, and a conduit section 66 leads from the valve 64 back to the return conduit 35, the sections 41, 65, and 66 forming part of the previously designated bypass 40. The construction of the valve 64 is shown in detail in Figures 8 and 10, and it will be seen that the valve 64 includes a stationary casing 67 which has a rotatable core 68 therein, the stem 63 being secured to the core 68. The core 68 is further provided with a passageway 69 which is mounted for movement into and out of registry with the conduit sections 41 and 65. Thus, in Figure 8 the valve 64 is shown closed so that no hydraulic fluid is flowing through the bypass, while in Figure 10 the valve 64 is open so that hydraulic fluid is flowing through the bypass 40 as when the pressure in the system is too high.

It will be seen that when the hydraulic fluid flows through the safety valve 39 and then through the conduit section 41 into the cylinder 42, the piston 48 will be moved from left to right in Figure 3 and this in turn will cause movement of the latch 51 from the position shown in Figures 3 and 7 to the position shown in Figure 9. As this movement occurs, the pin 58 will engage behind the handle 60 which is pivotally mounted on a pin 70, so that the handle 60 will rotate and this will cause rotation of the stem 63 of the valve 64 whereby the valve 64 will open so that hydraulic fluid can circulate through the bypass 40 so that damage to the parts will be prevented. After the pressure in the system has dropped sufficiently to a safe point as indicated on the gauge 71, the handle 55 can be manually depressed to free the keeper 54 from the opening 53 so that the coil spring 57 can return the parts from the position shown in Figure 9 back to the position shown in Figures 3 and 7 so that the clutch will be set so that the member 29 engages the friction disc 25 whereby the plate 18 will again rotate to cause the hydraulic fluid to be pumped through the system.

Referring to Figure 12 of the drawings, there is shown a detail sectional view of the gate valve 38. Thus, the gate valve 38 includes a movable core 72 that is provided with a passageway 73 that is mounted for movement into and out of registry with the opposed sections of the conduit 36. The core 72 is further provided with an opening or bore 74 which communicates with the passageway 73, and the bore 74 is adapted to be selectively moved into registry with a port 75 that may lead to a suitable reservoir or tank that can be used for holding or storing hydraulic fluid. The core 72 is adapted to be rotated to its various positions by means of a handle 76.

In Figure 12a there is shown a detail of the control valve 37 that is interposed in the return conduit 35. Thus, the valve 37 includes a manually operable handle 77 for rotating a movable core or valve member 78 which is provided with a passageway 79 that is adapted to be moved into and out of registry with the opposed sections of the return conduit 35. The core 78 further includes a bore or opening 80 which communicates with the passageway 79, and the bore 80 can be moved into registry with a conduit or line 81 that may lead to a reservoir or the like so that hydraulic fluid can be drained from the system when desired. As shown in Figure 12a the parts are adjusted so that hydraulic fluid flows straight through the valve 37 and is not returning to the reservoir or the like.

The numeral 82 designates a frame, Figures 1 and 2, which can be made of any suitable material such as metal, and the frame 82 includes a pair of spaced apart arms 83 and 84 which are adapted to be manually gripped, and the arms 83 and 84 are interconnected together by braces 85 and 86.

There is further provided a throttle and speed control valve which is designated generally by the numeral 87. The valve 87 is shown in detail in Figures 13–19 and includes a U-shaped bypass line 88 for a purpose to be later described. The valve 87 further includes a housing 93 which has a valve member or core 92 rotatably arranged therein, and the valve member 92 is provided with a pair of spaced apart slots 89 which are arranged diametrically opposite a pair of spaced apart ports 91. Hollow chambers 90 are arranged in the valve member 92, and the pair of hollow chambers 90 are separated by means of a partition 94, the slots 89 and ports 91 communicating with the pair of chambers 90.

Secured to the valve member 92 and projecting upwardly therefrom is a shank or stem 95 which carries a pointer 96 that is adapted to coact with a scale 97, Figures 13 and 19. A stop member 98 is provided for limiting movement of the pointer 96 in one direction, while a similar stop member or stop pin 99 is provided for limiting rotary movement of the pointer 96 in the opposite direction. Suitable indicia or markings may be arranged on the scale 97 as shown in Figure 19.

A manually operable means is provided for rotating the valve member 92, and this means comprises a handle 100 which is connected to the upper end of the shank 95, there being a connecting member 101 leading from the handle 100 to a lever 102 which is pivotally connected to the arm 84 by means of a pin 103. Thus, by manually depressing the lever 102, Figure 1, the handle 100 can be rotated to thereby rotate the valve member 92 to a desired position.

Also leading from the throttle valve 87 is a pair of conduits 104 and 105 which communicate with a hydraulic motor 106. The motor 106 is used for driving the chain saw as later described in this application, and it will thus be seen that the core 92 in the throttle valve 87 can be set as shown in Figure 14 so that all of the hydraulic fluid flows from the conduit 36 through the uppermost slot 89, then through the uppermost chamber 90 and then through the conduit 104 to the motor 106. Or, the core 92 can be rotated to the position shown in Figure 15 by means of the lever 102 so that the motor 106 will rotate at a slower speed from that which is attained when the valve is in the position shown in Figure 14. With the valve in the position of Figure 14 the bypass 88 is closed, but with the valve in the position of Figure 15, one half of the entering hydraulic fluid enters from the conduit 36, then passes through the uppermost slot 89 and out through the conduit 104 to the motor 106. At the same time the other half of the hydraulic fluid passes from the top chamber 90 through the upper port 91 then through the U-shaped bypass 88 and into the lower port 91 and then into the lower chamber 90. From the lower chamber 90 the hydraulic fluid passes out through the lower slot 89 and back to the return line 35 so that not as much hydraulic fluid is supplied to the actuating motor 106. As shown in Figure 16, a further adjustment of the core 92 is possible and in Figure 16 the core 92 is set so that all of the hydraulic fluid from the conduit 36 passes through the uppermost slot 89, then into the top chamber 90, then out through the top port 91 into the bypass 88 and from the bypass 88 the hydraulic fluid enters the lower port 91 and then enters the lower chamber 90 and then returns to the conduit 35 through the bottom slot 89 so that with the valve in the position shown in Figure 16 no hydraulic fluid is being supplied to the motor 106 so that the chain saw is not running. A pressure gauge 107 is arranged in the conduit 36 for indicating pressure in this line.

The motor 106 is shown in detail in Figures 5 and 6 and includes a hollow housing 108 and has a rotary wheel or plate 109 mounted therein. A plurality of vanes or blades 110 extend from the outer periphery of the plate 109, and a shaft 111 is rotatably supported in the housing 108. A hollow gear box 112 is rotatably connected to the housing 108 for a purpose to be later described, and a shaft 113 is rotatably supported in the gear box 112. A first bevel gear 114 is secured to the shaft 113, and the bevel gear 114 meshes with a bevel gear 115 that is mounted on an adjacent end of the shaft 111. A sprocket 117 is mounted on the upper end of the shaft 113, and an endless saw chain 118 is trained over the sprocket 117. The saw chain 118 also extends around a guide rail or bar 116 which has a second sprocket 119 mounted on its outer end. As shown in Figure 1, the saw chain 118 can be used for felling a tree such as the tree 120.

A means is provided for rotating the chain saw to different angular positions so that different angular cuts can be made in the tree or other object being cut, and this means comprises a sleeve or collar 121 which is secured to the housing 108 in any suitable manner, as for example by means of bolts 122. The sleeve 121 includes an offset portion which rotatably receives therein an annular flange 123 which is formed integral with or secured to the gear box 112. Set screws 124 extend through the offset portion of the sleeve 121 and into engagement with the flange 123 for maintaining the gear box 112 immobile in its various adjusted positions.

There is further provided for the motor 106 a bypass line 125 which has interposed therein a valve 64' and a clutch control mechanism 34', and these members have substantially the same construction and operation as the previously described members 34 and 64. A safety valve 39' is also arranged adjacent to the motor 106, and the safety valve 39' has the same construction as the previously described safety valve 39, there being a gate valve 126 positioned in the conduit 104 which serves to supply hydraulic fluid to the top of the motor 106. A line or bypass 40' leads from the safety valve 39' to the cylinder of the clutch control mechanism 34', and the bypass 40' has the same purpose as the previously described bypass 40, the bypass 40' and bypass 125 being interconnected through the clutch control mechanism 34' and the valve 64'.

There is one difference between the clutch control mechanism 34' and the previously described clutch control mechanism 34 since a different means is provided for releasing the keeper 54 on the clutch control mechanism 34'. Thus, as shown in Figure 5 a bell crank lever 127 is connected to the lower end of the keeper 54, and the lever 127 is pivotally connected below the cylinder 42 by means of a pin 128, there being a connecting member 129 extending from the lower end of the lever 127 to a lever 130 that is pivotally mounted on the arm 83 of the frame 82. Thus, by manually depressing the lever 130 which is pivotally mounted on the arm 83 by means of the pin 131, the keeper 54 can be depressed so that the spring 57 will return the parts of the clutch control mechanism 34' to the position shown in Figure 5 after pressure in the system decreases sufficiently.

Similar numerals have been used to designate the remaining parts of the clutch such as the friction disc and the like which coact with the plate 109 to selectively cause simultaneous rotation of the plate 109 and shaft 111.

From the foregoing it is apparent that there has been provided a chain saw which is adapted to be actuated by a hydraulic system that operates off a tractor power take-off such as the power take-off 12. In use the tractor 10 may be started in the usual manner whereby the power take-off 12 will be actuated and this in time will rotate the endless belt 22. Rotation of the belt 22 causes rotation of the shaft 19 and this in turn causes rotation of the plate 18 and blades 20 when the clutch is in the position shown in Figure 3. Thus, hydraulic fluid will be pumped from the return conduit 35 to the lower end of the housing 17 and this hydraulic fluid will be forced out of the top of the housing 17 under pressure through the conduit 36. Normally this hydraulic fluid under pressure will pass through the conduit 36 until it reaches the throttle and speed control valve 87. Depending upon how the valve 87 is set, this hydraulic fluid will either bypass the motor 106 completely or else be fed partially or completely to the motor 106 so that the plate 109 will rotate at a desired speed. The hydraulic fluid enters the motor 106 through the conduit 104 and impinges against the blades 110 which cause rotation of the plate 109 and this in turn causes rotation of the shaft 111 providing the clutch is in the position shown in Figure 5. The hydraulic fluid leaves the motor 106 through the conduit 105 and then passes through the bottom of the valve 87 and then into the conduit 35 from where it is returned to the bottom of pump 16 and this hydraulic fluid is continually pumped through the system. As the shaft 111 is rotated by the plate 109, the gear 115 rotates the gear 114 and this rotates the sprocket 117 which causes rotation of the endless chain 118 that has the cutting teeth thereon so that objects such as the tree 120 can be effectively cut or felled.

When the saw is being used, the ends of the arms 83 and 84 are manually gripped so that the saw can be readily moved to any desired position. By loosening the set screws 124, the gear box 112 can be rotated with respect to the housing 108 so that different angular cuts can be made and then the set screws 124 can be tightened to maintain the saw immobile in its adjusted positions.

In the event that the hydraulic fluid pressure in the system increases beyond a predetermined limit, a safety mechanism is provided which prevents damage to the parts. Thus, if pressure in the conduit 36 increases too much, the safety valve 39 will open and hydraulic fluid will enter the conduit section 41 and then cause the piston 48 to move from the left to the right in Figure 3 until the keeper 54 engages in the opening 53 in the latch 51. This movement of the piston 48 moves the collar 26 to the left from its Figure 3 position so that the member 29 will move away from the member 25 and the plate 18 will stop rotating and therefore the hydraulic fluid will not be pumped through the system to damage the parts. At the same time that the piston 42 is being moved by the incoming hydraulic fluid, the valve 64 will be opened due to the handle 60 being actuated by the pin 58 so that the handle 60 moves from the position shown in Figure 7 to the position shown in Figure 9 whereby the valve 64 will be opened so that the hydraulic fluid can circulate through the bypass 66 back to the line 35. When the hydraulic pressure decreases sufficiently, the handle 55 is manually depressed and the coil spring 57 will then return the parts to the position shown in Figure 3. The safety arrangement for the pump 106 works similarly so that if hydraulic fluid pressure in the conduit 104 gets too high, the safety valve 39' will open and fluid will bypass the motor 106 and go through the conduit 40' and then through the clutch control mechanism 34' and this will open the valve 64' so that the hydraulic fluid passes through the line 125 back to the conduit 105. The keeper 54 on the control mechanism 34 can be released by manually depressing the lever 130 when the pressure decreases sufficiently.

Referring to the scale 97 in Figure 19, it will be seen that the pointer 96 is positioned to indicate that the valve 87 is open to the motor 106 with the bypass 88 closed. When the pointer 96 moves to the next position, the bypass will be three-quarters of the way closed, and at the same time the motor 106 will be opened a corresponding amount. When the pointer 96 registers with the indicia "Closed" on the scale 97, the bypass 98 will be opened fully and no hydraulic fluid will be passing to the motor 106. As previously stated the pump 16 can be operated by gear mechanism from the tractor power take-off 12 instead of from the belt drive. Legs 132 may be secured to the motor 106 so as to provide a support for the chain saw when it is not being used. With the present invention the hydraulic fluid is increased in pressure as it is pumped so as to drive the chain saw and the flow of fluid is controlled as previously described.

Referring to Figure 6 of the drawings, the valve 126 has two important functions. Thus, when the valve 126 is closed and the throttle opened, the saw clutch will be thrown out of gear. Also, perhaps the most important function of the valve 126 is that it does not make any difference if the clutch is out of gear or not if this valve is closed since no power can reach the power wheel. Thus, the valve 126 acts as a safety device so that for example the saw can be transported from one location to another and even though the throttle may be accidentally hit or engaged, no serious accidents will result if this valve is closed.

I claim:

In a device of the character described, a tractor, a hydraulic pump secured to said tractor and including a hollow housing, a driven shaft projecting into said housing, driving means connected to said driven shaft, said pump including a plate rotatably mounted in said housing and loosely mounted on said shaft, a plurality of blades extending from the outer periphery of said plate, a return conduit connected to the lower end of said housing, a supply conduit extending from the upper end of said housing, a gauge and safety valve connected to said supply conduit, a bypass line connecting said safety valve to said return conduit, a friction disc secured to one side of said plate, a clutch member positioned in said housing and including a ring member mounted for movement into and out of engagement with said friction disc, a collar keyed to said shaft and secured to said clutch member, a lever pivotally mounted in said housing and having its inner end engaging said collar, a clutch control mechanism arranged exteriorly of said housing and including a hollow cylinder, a piston slidably mounted in said cylinder, a rod extending from said piston and connected to said lever, a coil spring circumposed on said rod, an L-shaped latch connected to said rod and provided with an opening therein, a spring pressed keeper connected to an end of said cylinder and adapted to engage the opening in said latch, a pair of spaced apart pins extending upwardly from said latch, a control valve interposed in said bypass line and including a casing having a rotatable core therein, a stem extending upwardly from said core and having teeth thereon, a handle adapted to be engaged by said pins and having teeth engaging the teeth on said stem, manually operable gate valves interposed in said return and supply conduits, a frame including a pair of spaced apart arms, braces interconnecting said arms together, a hydraulic motor connected to said frame and including a housing, a stub shaft extending into said housing, a plate loosely mounted on said stub shaft and having a plurality of blades extending from its periphery, a clutch for selectively causing said last named plate to rotate with said stub shaft, a clutch control mechanism for actuating said clutch, a lever mounted on one of said arms for actuating said last named clutch control mechanism, a sleeve extending from said housing, a gear box having a flange rotatably positioned in said sleeve, a shaft member supported in said gear box, gear means connecting said shaft member to said stub shaft, a sprocket connected to said shaft member, a saw chain engaging said sprocket, a throttle valve assembly connected to said return and supply conduits and including a casing, a valve rotatably arranged in said casing and including upper and lower chambers, a partition interposed between said pair of chambers, there being openings communicating with said chambers, a bypass line for interconnecting said chambers together, a shank extending upwardly from said last named valve, and a manually operable lever on one of said arms for rotating said shank to control said throttle valve assembly, said motor being connected to said pump by said supply and return conduits.

References Cited in the file of this patent

UNITED STATES PATENTS

| | | |
|---|---|---|
| 1,043,480 | Sunch | Nov. 5, 1912 |
| 2,326,854 | Hassler | Aug. 17, 1943 |
| 2,405,135 | Butzbach | Aug. 6, 1946 |
| 2,411,623 | Jaques | Nov. 26, 1946 |
| 2,698,035 | Smith | Dec. 28, 1954 |

FOREIGN PATENTS

| | | |
|---|---|---|
| 893,292 | France | Jan. 24, 1944 |